(12) United States Patent
Urakawa et al.

(10) Patent No.: US 7,453,613 B2
(45) Date of Patent: Nov. 18, 2008

(54) SCANNING TYPE IMAGE FORMING APPARATUS HAVING THE SAME CONTAINING SCANNING MIRROR IN A SPACE SEALED BY FIRST AND SECOND OPTICAL MEMBERS AND THE HOUSING, THE SECOND OPTICAL MEMBER INCLUDES FIVE SURFACES

(75) Inventors: Takashi Urakawa, Kanagawa (JP);
Akira Yamamoto, Kanagawa (JP);
Keiichiro Ishihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

(21) Appl. No.: 11/069,233

(22) Filed: Feb. 28, 2005

(65) Prior Publication Data

US 2005/0190426 A1    Sep. 1, 2005

(30) Foreign Application Priority Data

Mar. 1, 2004    (JP) ............................. 2004-056028

(51) Int. Cl.
*G02B 26/08*    (2006.01)
*G01C 3/08*    (2006.01)
*G01R 23/02*    (2006.01)

(52) U.S. Cl. .................... 359/196; 356/4.01; 250/342
(58) Field of Classification Search .................. 359/199, 359/198, 223, 224, 630, 197, 227, 212, 291, 359/838, 629, 648, 462, 872, 201, 204, 280, 359/282, 302, 290, 883, 631, 831; 348/195, 348/474; 345/8; 352/84, 105; 358/474–498; 353/30; 385/18

See application file for complete search history.

(56) References Cited

U.S. PATENT DOCUMENTS 3,484,149 A * 12/1969 Becker et al. ............... 359/414

(Continued)

FOREIGN PATENT DOCUMENTS

JP    8-334723    12/1996
JP    3219465    8/2001

OTHER PUBLICATIONS

M.P. Helsel, et al.; "Wafer Scale Packaging for MEMS Video Scanner"; MEMS Design, Fabrication, Characterization, and Packaging; Proceedings of SPIE; vol. 4407; (2001); pp. 214-220.

*Primary Examiner*—Stephone B. Allen
*Assistant Examiner*—Jennifer L. Doak
(74) *Attorney, Agent, or Firm*—Morgan & Finnegan, LLP

(57) ABSTRACT

The object of the present invention is to provide an optical scanning apparatus which is not limited in the disposition of a scanning device, can reduce the adherence of dust to each member of the scanning device, and is enhanced in the reliability of the scanning device, and an image displaying apparatus having the same. The optical scanning apparatus includes a housing for containing and holding therein a scanning device provided with a movable mirror, an elastic supporting portion for supporting the movable mirror swingably about a swinging center, and a supporting base for supporting the elastic supporting portion, an optical member OE constituting a first optical system for directing a beam to the scanning device in the housing, and an optical member OX constituting a second optical system for emerging the beam passed through the scanning device. At least a part of the optical member OE and at least a part of the optical member OX constitute a part of the housing, and are provided so that a space in which the scanning device is contained in the housing configures a sealed space.

2 Claims, 3 Drawing Sheets

U.S. PATENT DOCUMENTS

| | | | |
|---|---|---|---|
| 4,915,487 A * | 4/1990 | Riddell et al. | 359/630 |
| 5,467,104 A | 11/1995 | Furness, III et al. | |
| 5,606,447 A | 2/1997 | Asada et al. | |
| 6,178,027 B1 * | 1/2001 | Asada et al. | 359/201 |
| 6,295,154 B1 * | 9/2001 | Laor et al. | 359/223 |
| 6,394,608 B1 * | 5/2002 | Shiraishi et al. | 353/57 |
| 6,507,543 B2 * | 1/2003 | Fujimaki et al. | 369/44.19 |
| 6,791,731 B2 * | 9/2004 | Ryu et al. | 359/224 |
| 2001/0022682 A1 * | 9/2001 | McClelland et al. | 359/280 |
| 2001/0033440 A1 * | 10/2001 | Togino | 359/883 |
| 2002/0164113 A1 * | 11/2002 | Rensing et al. | 385/18 |
| 2004/0114225 A1 * | 6/2004 | Engelhardt et al. | 359/385 |
| 2004/0136041 A1 * | 7/2004 | Togino | 359/196 |

* cited by examiner

SCANNING TYPE IMAGE FORMING APPARATUS HAVING THE SAME CONTAINING SCANNING MIRROR IN A SPACE SEALED BY FIRST AND SECOND OPTICAL MEMBERS AND THE HOUSING, THE SECOND OPTICAL MEMBER INCLUDES FIVE SURFACES

BACKGROUND OF THE INVENTION

1. Field of the Invention

This invention relates to an optical scanning apparatus and an image displaying apparatus having the same, and is suitable, for example, for an image displaying apparatus of a scanning type for scanning a surface to be scanned with a light beam optically modulated on the basis of image information from light source means to thereby display and observe a two-dimensional image, or directly direct a two-dimensional image to an eyeball and observe it.

2. Related Background Art

There is known an image displaying apparatus for scanning an observer's retina by the use of optical scanning means capable of two-dimensionally scanning with a beam optically modulated on the basis of image information from light source means to thereby display an image (for example, U.S. Pat. No. 5,467,104). U.S. Pat. No. 5,467,104 discloses the technique of scanning with red, blue and green beams in a two-dimensional direction, i.e., a horizontal direction and a vertical direction, by scanning means, and directly forming a two-dimensional image on the retina through an optical system.

Such an image displaying technique need not use a displaying element in which a plurality of pixels are formed in accordance with necessary resolution as in an image displaying apparatus using a two-dimensional or one-dimensional image displaying element, since an image is displayed by scanning with a beam, and the image displaying technique has the feature that a faulty pixel does not occur in principle.

In realizing an image displaying apparatus using such scanning means, a micro electro mechanical system (hereinafter referred to as the MEMS technique) manufactured by a semiconductor manufacturing process is known as optical scanning means (for example, U.S. Pat. No. 5,606,447 and Japanese Patent Application Laid-Open No. H08-334723). The optical scanning means manufactured by the MEMS technique is compact and light in weight and can operate at a high speed, and such features are suitable for the image displaying apparatus. There is also known the MEMS technique of two-dimensional scanning means for a head-mounted-display apparatus (for example, SPIE Conference #4407, 19 (June 2001) Wafer scale packaging for a MEMS video scanner).

In the optical scanning means by these MEMS techniques, a surface reflecting light is resonated by a torsion bar or the like and with the torsion due to the resonance the light reflecting surface is inclined and deflect the light incident on the reflecting surface to scan with the light.

On the other hand, in an image displaying apparatus for enlarging and displaying, in combination with an optical system, an image displayed by scanning with a beam optically modulated by an optical scanning apparatus using a galvano mirror on the basis of image information, there is known an image displaying apparatus in which the alignment of the optical scanning apparatus and the optical system is effected highly accurately (for example, Japanese Patent No. 3219465).

As the optical scanning apparatuses manufactured by the conventional MEMS technique, there have been proposed one in which a scanning surface (reflecting surface) for deflecting a light beam is vacuum-sealed and one which is driven under the atmospheric pressure. In the optical scanning apparatus wherein the scanning surface is vacuum-sealed, a scanning device is packaged and therefore the problem of dust or the like does not readily arise, but yet the cost becomes high due to an increase in the assembling steps.

On the other hand, in the scanning device driven under the atmospheric pressure, a coil as driving means and a magnet are disposed near the scanning surface and therefore, a magnetic material such as iron powder has tended to be attracted by the magnetic force thereof or minute dust has tended to adhere to a member such as a reflecting mirror constituting the scanning device by static electricity.

There is a method of disposing a protective member in order to reduce the adherence of dust before light is incident on the scanning device, but this method suffers from the optical problem that there is produced stray light or the like having nothing to do with image display which has been reflected by or transmitted through the protective member. Also, by disposing the protective member, a limitation occurs to the disposition of the scanning device. Besides these, there is the problem that the provision of the protective member leads to an increase in the number of parts, which in turn leads to the complication of the construction of the scanning device.

SUMMARY OF THE INVENTION

The present invention has as its object the provision of an optical scanning apparatus which is not limited in the disposition of a scanning device and in which the adherence of dust to each member of the scanning device can be reduced and the reliability of the scanning device is enhanced, and an image displaying apparatus having the same.

The optical scanning apparatus of the present invention comprises a housing for containing and holding therein a scanning device provided with a movable mirror, an elastic supporting portion for supporting the movable mirror swingably about a swinging center, and a supporting base for supporting the elastic supporting portion, an optical member OE constituting a first optical system for directing a beam to the scanning device in the housing, and an optical member OX constituting a second optical system for emerging the beam passed through the scanning device, wherein at least a part of the optical member OE and at least a part of the optical member OX constitute a part of the housing, and are provided so that a space in which the scanning device is contained in the housing configures a sealed space.

According to the present invention, there can be achieved an optical scanning apparatus which is not limited in the disposition of a scanning device and in which the adherence of dust to each member of the scanning device can be reduced and the reliability of the scanning device is enhanced, and an image displaying apparatus having the same.

DESCRIPTION OF THE PREFERRED EMBODIMENTS

First Embodiment

Figure 1:
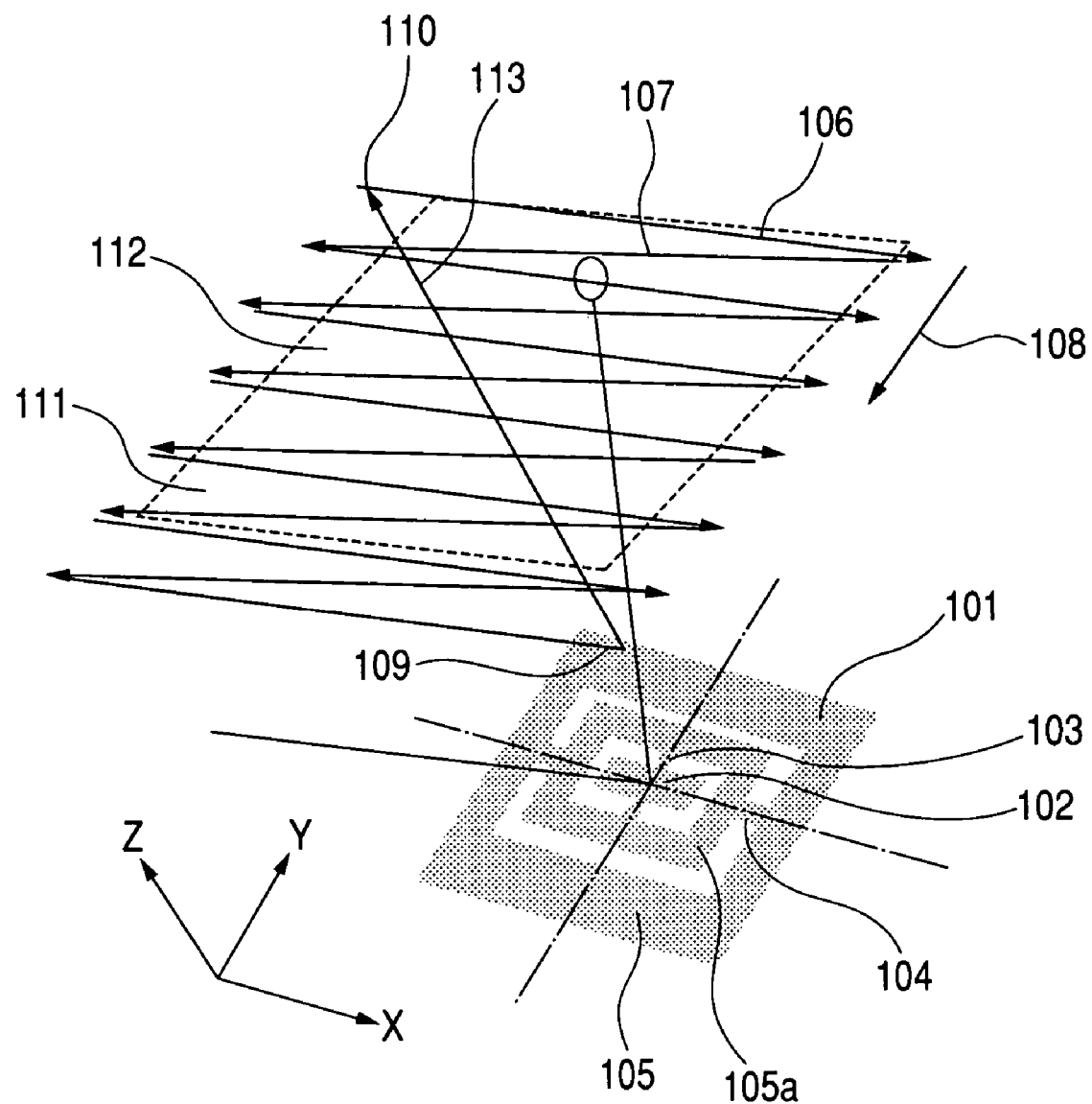
FIG. 1 illustrates an image displaying method by a scanning device.

Description will first be made of an image displaying method by a scanning device 101 used in an image displaying apparatus. FIG. 1 shows the relation between the construction of the main portion of the scanning device 101 according to a first embodiment of the present invention and a surface 111 to be scanned. A movable mirror (deflecting and reflecting mirror) 102 is formed in the central portion of the scanning device 101. The movable mirror 102 is provided with a torsion bar (elastic supporting portion) 103 for swinging it in a first direction, and a torsion bar (elastic supporting portion) 104 for swinging it in a second direction substantially perpendicular to the first direction, to whereby forms gimbals structure.

In order to hereinafter describe the construction of the scanning device 101, use is made of a coordinates axis as shown in FIG. 1 wherein a direction including the torsion bar 104 is the X-axis, a direction including the torsion bar 103 is the Y-axis, and a direction normal to the surface of the movable mirror 102 is the Z-axis. The movable mirror 102 is driven to swing, and each of the X-axis and the Y-axis will hereinafter be referred to as the rotation axis of the movable mirror 102.

These torsion bars 103 are supported by a supporting base portion 105a. Also, the supporting base portion 105a is supported by a supporting base portion 105 through the torsion bar 104. By adopting such structure, the torsion bars 103 and 104 become capable of being twisted independently of each other, and the movable mirror 102 can be two-dimensionally swung.

With respect to the X-axis direction (horizontal direction), the movable mirror 102 is driven by an actuator (swinging means), not shown, using an electromagnetic force, an electrostatic force or the like, and by the torsion resonance action of this structure, the deflection angle of the reflecting surface of the movable mirror 102 is changed and performs scanning with the light.

With respect to the Y-axis direction (vertical direction), the movable mirror is controlled so as to be synchronized with the X-axis direction, and is driven in a saw-tooth wave shape or a triangular shape by the actuator, not shown.

In FIG. 1, a line 106 designates the outward path of scanning lines in the horizontal direction by a swinging operation, and a line 107 denotes an example of the inward path thereof. Actually, the number of the scanning lines is greater than that shown in FIG. 1, but the scanning lines are shown in a thinned form in order to make them readily understood.

In the present embodiment, the reflecting mirror 102 is operated so as to scan in the direction of arrow 108 which is y-direction in synchronization with its swinging operation, and beams emerging from light source means in synchronization with one another are optically modulated to thereby effect the display of an image within an effective area 112. When the scanning line goes to a scanning end 109 in the vertical direction (y-direction), it returns to a scanning start point 110 as indicated by a return line 113.

That is, the repetition cycle in the vertical direction (y-direction) determines the frame rate (frame frequency) of an image.

In the following embodiments, the movable mirror 102, the torsion bars 103, 104, the supporting base portion 105, etc. will be referred to as the scanning device 101.

In the present embodiment, the interior of the effective area 112 on the surface to be scanned is raster-scanned by the construction as described above to thereby display an image.

Figure 2A:
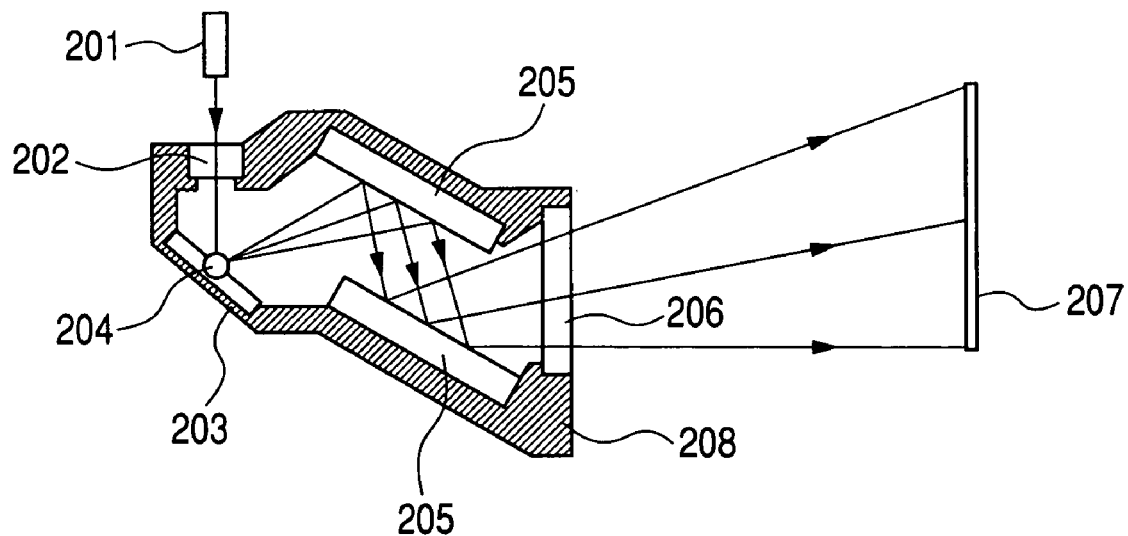
FIG. 2A is a cross-sectional view of the essential portions of a scanning type optical system according to first embodiment of the present invention.
Figure 2B:
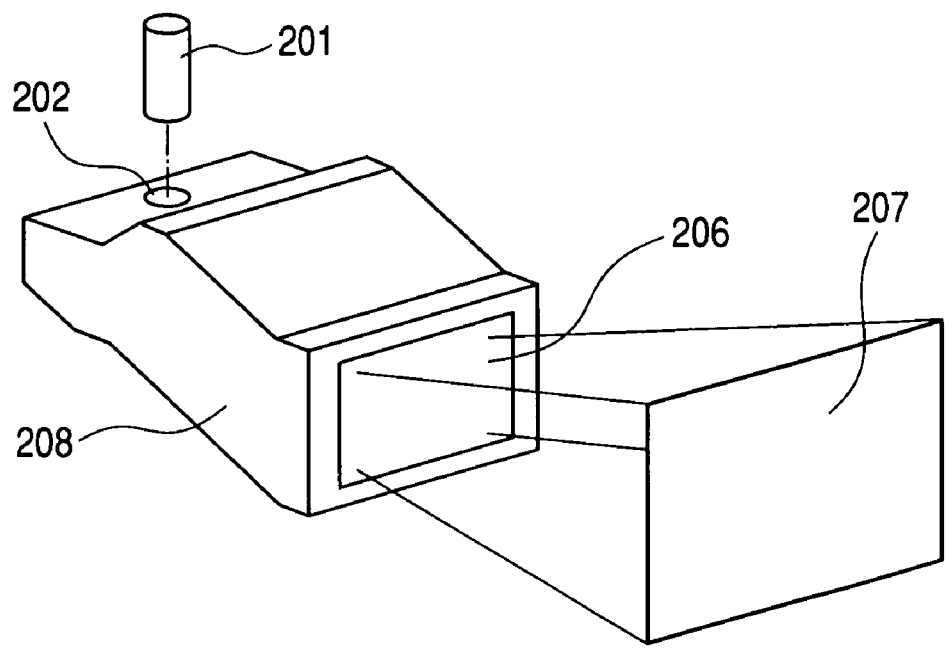
FIG. 2B is a perspective view of the essential portions of a scanning type optical system according to first embodiment of the present invention.

FIGS. 2A and 2B are a cross-sectional view and a perspective view, respectively, of the essential portions of the first embodiment of the scanning type image displaying apparatus of the present invention.

In the present embodiment, a mirror type scanning optical system is used as a scanning optical system 205, and a beam based on image information is projected onto a screen as a surface 207 to be scanned.

In FIGS. 2A and 2B, a beam emitted from a light source 201 is optically modulated by a drive controlling circuit, not shown, on the basis of the input signal of an image to be displayed. The beam emitted from the light source 201 is transmitted through a condensing optical system (first optical system) 202 and travels toward scanning means 203 of a construction shown in FIG. 1 which is capable of two-dimensional scanning. The scanning device 101 manufactured by a semiconductor manufacturing process as shown in FIG. 1 is provided in the interior of the scanning means 203, and the incident light is deflected and reflected by a deflecting point (reflecting mirror) 204 on the scanning device 101.

The beam deflected by the scanning means 203 is reflected by the scanning optical system 205, and transmits through an emergence window 206 comprising a transparent member so that the beam from the light source 201 may be condensed on the surface 207 to be scanned. At this time, the scanning by the scanning means 203 and the modulation of the beam emitted from the light source 201 are synchronized with each other, whereby an image based on an image signal is displayed on the surface 207 to be scanned.

In the present embodiment, at least one of the transparent member 206 and the condensing optical system 202 can be given optical power.

Also, in the present embodiment, each of the scanning optical system 205 and the transparent member 206 constitutes an element of a second optical system.

The scanning means 203 in the present embodiment is a scanning device which can two-dimensionally scan, but of course, two one-dimensional scanning devices may be used to display a two-dimensional image.

As shown in FIGS. 2A and 2B, the scanning optical system 205 and the scanning means 203 are held by a mechanical frame (housing) 208. Although not shown, the mechanical frame 208 is designed to be divisible into upper and lower portions. The dividing method is not restricted thereto, but the mechanical frame may be designed to be divisible into left and right portions, or may be constituted by several parts. A closed space (sealed space) is formed by this mechanical frame 208 and the optical members 202 and 206.

The housing 208 is sealed by the nearest optical members before and behind the scanning means 203 through which the beam is transmitted to thereby make the sealed space as small as possible.

One or more of the reflecting mirrors of the scanning optical system 205 in the present embodiment are reflection type optical systems constituted by free form surfaces. Therefore, they can be part of a construction sealing the space, but do not become members sealing the space.

Accordingly, in the present embodiment, a closed space including the optically available surface of the scanning means 203 is formed by the mechanical frame 208, the condensing optical system 202 and the optical member 206 constituting the emergence window. Thereby, the sealing of this space is effected.

The optical member 202 through which the beam is transmitted and enters the sealed space and the optical member 206 through which the beam is transmitted and emerges play the role as the lid of the sealed space, and no new member need be disposed to form the sealed space and thus, it becomes possible to increase the degree of freedom of design in effecting optical design.

This sealed space may be hermetically sealed or may be substantially sealed so as to be capable of preventing the entry of unallowable dust.

Design is made to prevent dust from entering the sealed space during the assembly of the entire apparatus, thereby preventing the dust from adhering to each member of the scanning device 101.

In the present embodiment, by adopting such a construction, the possibility of dust entering from the outside can be reduced and reliability is improved.

Further, in the present embodiment, in order to prevent the rise in temperature in the sealed space, the light source 201 is disposed outside the sealed space.

As described above, in the present embodiment, there are provided the light source 201, the optical systems 202, 205, 206 for condensing the beam optically modulated on the basis of the image information from the light source, and forming a light source image, and the scanning means 203, and the scanning means 203 scans the light source image on a predetermined scanning surface, and design is made such that the beam from the light source 201 is modulated in synchronization with the scanning, whereby an image is displayed on the surface 207 to be scanned so that an observer may observe the image. At this time, an optical system or a member necessary to constitute the optical scanning apparatus is utilized to form the sealed space, and the scanning device is contained therein.

Thereby, instead of adding any new member to construct the sealed space, a minimum number of parts are used to constitute the sealed space.

Also, in the image displaying apparatus of the scanning type, the degree of freedom of disposition of the optical members can be increased and at the same time, number of the members necessary for the construction of a system can be reduced. Also, the scanning device is sealed by the optical members, whereby no stray light occurs and optical performance can be displayed.

Also, unnecessary members can be decreased and the adherence of dust to the scanning device 101 can be reduced and as a result, the durability of the scanning device 101 can be improved.

Second Embodiment

Figure 3A:
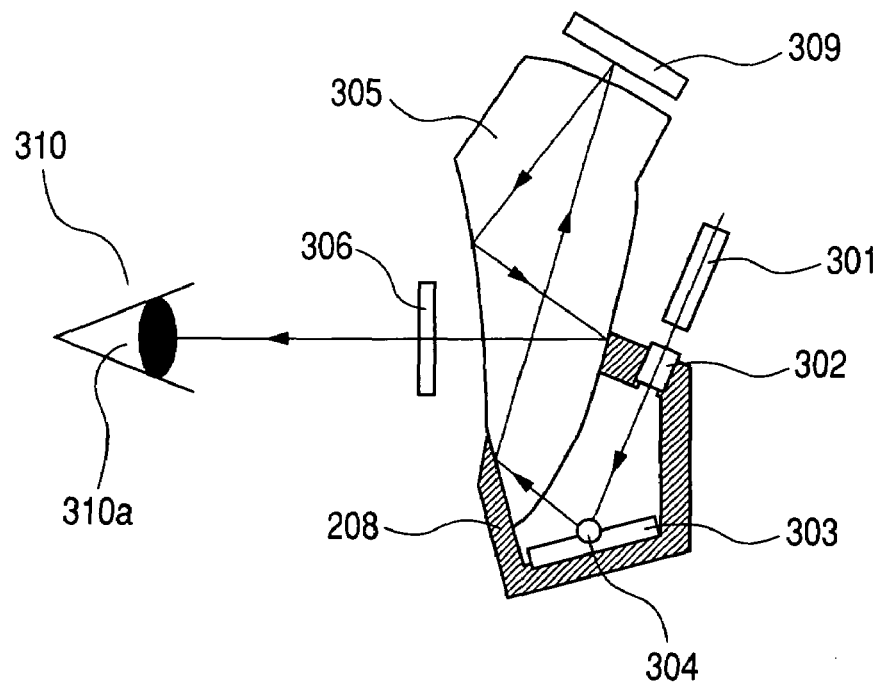
FIG. 3A is a cross-sectional view of the essential portions of a scanning type optical system according to second embodiment of the present invention.
Figure 3B:
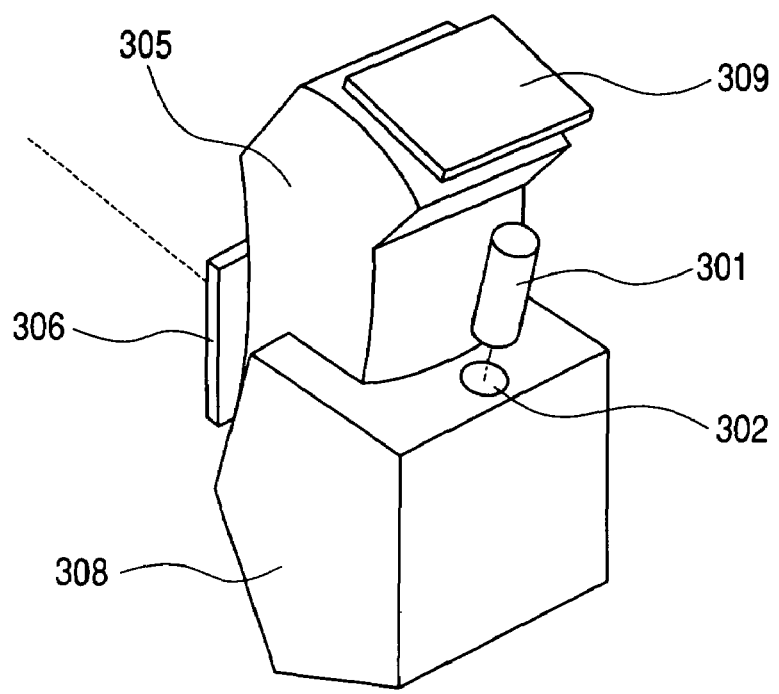
FIG. 3B is a perspective view of the essential portions of a scanning type optical system according to second embodiment of the present invention.

FIGS. 3A and 3B are a cross-sectional view and a perspective view, respectively, of the essential portions of a second embodiment of the scanning type image displaying apparatus of the present invention.

The present embodiment is applied to the viewfinder of a camera or an optical system for a head mounted display apparatus, and uses a prism type scanning optical system as a scanning optical system 305, and makes an observer 310 directly observe image information.

In FIGS. 3A and 3B, a beam emitted from a light source 301 is modulated by a drive controlling circuit, not shown, on the basis of the input signal of an image to be displayed.

The beam emitted from the light source 301 passes through such a condensing optical system (first optical system) 302 as causes the beam emitted from the light source 301 to be imaged on a deflecting point (reflecting mirror) 304, and thereafter travels toward scanning means 303 of the construction shown in FIG. 1 which is capable of two-dimensional scanning. In the interior of the scanning means 303, there is the scanning device 101 manufactured by the semiconductor process as shown in FIG. 1, and the incident light is deflected by the deflecting point (reflecting mirror) 304 on the scanning device 101.

The beam deflected by the scanning means 303 is internally reflected and imaged by a scanning optical system (second optical system) 305, and is reflected and diffused by a reflecting and diffusing plate 309, and thereafter again enters the scanning optical system 305, and then passes through an emergence window 306 and is directed to the eyeball 310a of the observer 310 so as to enable the observer 310 to observe the image. At this time, the scanning by the scanning means 303 and the modulation of the beam emitted from the light source 301 are synchronized with each other, whereby an image based on an image signal is displayed. The emergence window 306 need not be necessarily provided.

The scanning means 303 in the present embodiment is a scanning device which can two-dimensionally scan, but of course, two one-dimensional scanning devices may be used to display a two-dimensional image.

As shown in FIGS. 3A and 3B, the scanning optical system 305 and the scanning means 303 are held by a mechanical frame 308. Although not shown, the mechanical frame 308 is of such structure that the back side of the scanning means 303 can be removed like a lid.

The structure of the mechanical frame 308 is not restricted thereto, but the mechanical frame 308 may be made divisible into left and right portions, or may be comprised of several parts. A closed sealed space is constituted by this mechanical frame 308 and the optical member 305. It is possible to make the sealed space as small as possible by sealing it by the nearest optical members 302 and 305 before and behind the scanning means 303 through which the beam is transmitted.

The scanning optical system 305 in the present embodiment is a prism type scanning optical system of which at least one surface is constituted by a free form surface. The beam deflected by the deflecting point 304 in the scanning means 303 is transmitted through and enters the interior of the scanning optical system 305.

Therefore, in the present embodiment, the closed sealed space is constituted by only one surface (light incidence surface) of the scanning optical system 305, the condensing optical system 302 and the mechanical frame 308 holding them. This sealed space may be hermetically sealed or may be substantially hermetically sealed so as to be capable of preventing the entry of unallowable dust.

Design is made to prevent dust from entering the sealed space during the assembly of the entire apparatus, thereby preventing the dust from adhering to each member of the scanning device 101.

Also, the possibility of dust entering from the outside can be reduced, whereby reliability is improved. Also, in order to prevent the rise in temperature in the sealed space, the light source 301 is disposed outside the sealed space.

In the present embodiment, by constructing so, unnecessary members can be decreased and the adherence of dust to the scanning device 101 can be reduced and as a result, it is made possible to improve the durability of the scanning device 101.

Also, by using the scanning optical system 305 comprising a prism member, it is made possible to make the sealed space small to thereby make a unit itself small.

Also, a free form surface or surfaces are used as one or more surfaces of the scanning optical system 305, whereby a compact image good in optical performance is displayed.

In each of the above-described embodiments, the scanning device is easily manufactured by the use of a semiconductor process.

This application claims priority from Japanese Patent Application No. 2004-056028 filed Mar. 1, 2004, which is hereby incorporated by reference herein.

What is claimed is:

1. An image forming apparatus which scans a surface to be scanned with beam to form an image on the surface to be scanned, comprising:
    a scanning device including a scanning mirror swinging about a swinging center, an elastic supporting portion for supporting the scanning mirror, and a supporting base for supporting the elastic supporting portion;
    a housing for containing the scanning device therein;
    a light source;
    a first optical member for directing a beam emitted from the light source to the scanning mirror disposed in the housing, the first optical member having a condensing function;
    a second optical member for directing the beam reflected by the scanning mirror to the surface to be scanned; and
    an emergence window disposed between the second optical member and the surface to be scanned,
    wherein the first optical member, the scanning mirror and the second optical member are optical members different from one another,
    wherein the first optical member, the scanning mirror and the second optical member are supported by the housing,
    wherein a space containing the scanning device is sealed by the first optical member, the second optical member and the housing,
    wherein the second optical member includes a first optical surface, a second optical surface, a third optical surface, a fourth optical surface, and a fifth optical surface,
    wherein the beam reflected by the scanning mirror is refracted by the first optical surface, then reflected by the second optical surface, then refracted by the third optical surface to direct to a reflecting and diffusing plate, then reflected and diffused by the reflecting and diffusing plate, then refracted again by the third optical surface, then reflected by the fourth optical surface, then reflected by the fifth optical surface, and then transmitted through the fourth optical surface to be directed to the emergence window, and
    wherein the image forming apparatus swings the scanning mirror, thereby forming an image on the surface to be scanned.

2. An image forming apparatus according to claim 1, wherein the image forming apparatus comprises a viewfinder for a camera, and wherein the beam which exits from the second optical member is directed to an eyeball of an observer.

* * * * *